United States Patent
Rakic (10) Patent No.: US 10,711,924 B2
(45) Date of Patent: *Jul. 14, 2020

(54) FIRE AND SMOKE CONTAINMENT SERVICES TRANSIT UNIT AND AN ASSOCIATED METHOD

(71) Applicant: Rakman International Pty Ltd, Mona Vale, New South Wales (AU)

(72) Inventor: John Rakic, Mona Vale (AU)

(73) Assignee: Rakman International Pty Ltd, Mona Vale, New South Wales (AU)

( * ) Notice: Subject to any disclaimer, the term of this patent is extended or adjusted under 35 U.S.C. 154(b) by 0 days.

This patent is subject to a terminal disclaimer.

(21) Appl. No.: 16/680,486

(22) Filed: Nov. 11, 2019

(65) Prior Publication Data
US 2020/0080666 A1  Mar. 12, 2020

Related U.S. Application Data

(63) Continuation-in-part of application No. 15/519,135, filed as application No. PCT/AU2015/000508 on Aug. 24, 2015, now Pat. No. 10,471,284.

(30) Foreign Application Priority Data

Oct. 14, 2014  (AU) ............................... 2014904099

(51) Int. Cl.
*H02G 3/22* (2006.01)
*E04B 1/94* (2006.01)
(Continued)

(52) U.S. Cl.
CPC ............... *F16L 5/04* (2013.01); *A62C 2/065* (2013.01); *E04B 1/947* (2013.01); *H02G 3/22* (2013.01)

(58) Field of Classification Search
USPC ................................................ 52/220.8, 232
See application file for complete search history.

(56) References Cited

U.S. PATENT DOCUMENTS

| | | | |
|---|---|---|---|
| 4,109,423 A | 8/1978 | Perrain | A62C 2/065 52/1 |
| 4,219,173 A | 8/1980 | Forbes | F16L 5/04 248/56 |

(Continued)

FOREIGN PATENT DOCUMENTS

| | | | |
|---|---|---|---|
| DE | 3532983 A1 | 3/1987 | ............. E04B 1/941 |
| DE | 3532983 A1 | 3/1987 | |

(Continued)

OTHER PUBLICATIONS

Non-Final Office Action dated Feb. 4, 2019 in corresponding U.S. Appl. No. 15/519,135, filed Apr. 13, 2017; total 16 pages.

(Continued)

*Primary Examiner* — Robert Canfield
(74) *Attorney, Agent, or Firm* — Snell & Wilmer L.L.P.

(57) ABSTRACT

The fire and smoke containment services transit unit includes a casing constructed from a material such as plastic or timber having a thermal conductivity of less than 5 watts per meter per Kelvin. The casing defines a first opening at a first end and a second opening at a second end. Intermediate the first and second ends is an internal volume encased by the casing. The internal volume and each of the openings and are sized to allow services such as cables, pipes, etc., to be threaded through the services transit unit. An intumescent material is housed within the internal volume. Prior to exposure to the heat of a fire, the intumescent material maintains a slim profile. When exposed to the heat associated with a building fire, the intumescent material swells and (Continued)

seals the internal volume against the passage of fire, smoke or heated gases through the transit unit.

8 Claims, 6 Drawing Sheets

(51) Int. Cl.
*F16L 5/04* (2006.01)
*A62C 2/06* (2006.01)

(56) References Cited

U.S. PATENT DOCUMENTS

| | | | | |
|---|---|---|---|---|
| 4,249,353 | A * | 2/1981 | Berry | F16L 5/04 52/232 |
| 4,276,332 | A * | 6/1981 | Castle | A62C 3/16 138/149 |
| 4,304,079 | A | 12/1981 | Thorsten | E04B 5/48 174/48 |
| 4,419,535 | A | 12/1983 | O'Hara | H02G 3/22 169/48 |
| 4,901,488 | A | 2/1990 | Murota | F16L 5/04 52/232 |
| 5,344,106 | A | 9/1994 | Beele | A62C 2/06 248/56 |
| 5,398,467 | A | 3/1995 | Ricq | A62C 2/065 169/48 |
| 5,456,050 | A | 10/1995 | Ward | A62C 2/065 52/1 |
| 6,862,852 | B1 | 3/2005 | Beele | A62C 2/065 137/67 |
| 2005/0133242 | A1 | 6/2005 | Kreutz | E04F 17/08 174/654 |
| 2006/0070319 | A1 | 4/2006 | Flynn | F16L 5/04 52/220 |
| 2011/0088917 | A1 * | 4/2011 | Lee | A62C 2/06 169/45 |
| 2012/0100319 | A1 | 4/2012 | Keller | A62C 2/06 428/34.5 |

FOREIGN PATENT DOCUMENTS

| | | | | |
|---|---|---|---|---|
| DE | 3624407 | A1 | 2/1988 | H02G 3/22 |
| DE | 3624407 | A1 | 2/1988 | |
| DE | 3943165 | A1 | 7/1991 | A62C 2/06 |
| DE | 3943165 | A1 | 7/1991 | |
| DE | 19714625 | A1 | 10/1998 | |
| DE | 19714625 | A1 | 10/1998 | E04B 5/12 |
| DE | 20 2012 002 553 | U | 5/2012 | |
| DE | 202012002553 | U1 | 6/2012 | |
| EP | 0 869 303 | A2 | 3/1998 | |
| EP | 0869303 | A2 | 10/1998 | |
| EP | 2061126 | A2 | 5/2009 | |
| EP | 2061126 | A2 | 5/2009 | C09K 21/02 |
| EP | 2570158 | A1 | 3/2013 | |
| EP | 2570158 | A1 | 3/2013 | A62C 2/12 |
| EP | 2863141 | A1 | 4/2015 | F24F 13/20 |
| EP | 2863141 | A1 | 4/2015 | |
| JP | 08028761 | A | 2/1996 | |
| JP | 08028761 | A | 2/1996 | F16L 5/04 |
| JP | 2008132244 | A | 6/2008 | |
| JP | 2008132244 | A | 6/2008 | F16L 5/04 |
| JP | 5460910 | B1 | 4/2014 | |
| JP | 5460910 | B1 | 4/2014 | A62C 3/065 |
| JP | 5576576 | B2 | 8/2014 | |
| JP | 5576576 | B2 | 8/2014 | |
| WO | WO-2004096369 | A1 * | 11/2004 | A62C 3/16 |

OTHER PUBLICATIONS

Notice of Allowance dated Jul. 10, 2019 in corresponding U.S. Appl. No. 15/519,135, filed Apr. 13, 2017; total 11 pages.
Supplementary European Search Report dated May 7, 2018 for corresponding EP Application No. 15851063.6 filed Aug. 24, 2015; total 7 pages.
International Preliminary Report on Patentability dated Oct. 13, 2016 for correspondence International Application No. PCT/AU2015/000508 filed Aug. 24, 2015; total 12 pages.
International Search Report and Written Opinion dated Oct. 26, 2015 for corresponding International Application No. PCT/AU2015/000508 filed Aug. 24, 2015; total 10 pages.
7 page machine translation of EP 0 869 303 A2, from EPO translation portal. Translated Jan. 30, 2019. (Year: 2019).
15 page machine translation of DE 20 2012 002 553 U1, from EPO translation portal. Translated Jan. 30, 2019. (Year: 2019).

* cited by examiner

SECTION B-B

Fig. 6

SECTION A-A

FIRE AND SMOKE CONTAINMENT SERVICES TRANSIT UNIT AND AN ASSOCIATED METHOD

CROSS-REFERENCE TO RELATED APPLICATIONS

This patent application is a continuation-in-part of U.S. application Ser. No. 15/519,135, filed Apr. 13, 2017, which is a U.S. National Stage entry under 35 U.S.C. § 371 of International Application No. PCT/AU2015/000508, filed Aug. 24, 2015, which claims priority to Australian Application No. 2014904099, filed Oct. 14, 2014, which applications are hereby incorporated by reference in their entirety.

TECHNICAL FIELD

The present invention relates to a fire and smoke containment services transit unit and an associated method. Embodiments of the present invention find application in the field of passive fire protection.

BACKGROUND ART

Any discussion of documents, acts, materials, devices, articles or the like which has been included in this specification is solely for the purpose of providing a context for the present invention. It is not to be taken as an admission that any or all of these matters form part of the prior art base or were common general knowledge in the field relevant to the present invention as it existed in Australia or elsewhere before the priority date of this application.

Prior art transit units are known whereby services, such as cables, pipes, etc., are routed through barriers (for example walls, floors, ceilings and service shafts), in a manner that provides a degree of passive fire protection. It is desirable for such transit units to exhibit integrity characteristics (i.e. where the product provides resistance to the passage of flames or hot gasses for a predetermined time) and insulation characteristics (i.e. where one side of the product is exposed to an elevated temperature and the other side of the product must not exceed a pre-determined temperature rise within a predetermined time). It has been appreciated by the inventor of the present application that typical prior art transit units, such as the Abesco CT120 and CT240 cable transit units for example, perform relatively well in relation to the integrity characteristics; however, they typically perform fairly poorly in relation to the insulation characteristics.

In an attempt to improve the insulation characteristics of the prior art units, it is known to apply a thermally non-conducting wrap to the transit units and the services passing there through. These are held in place with steel strapping that is mechanically fixed in a permanent manner. However, it has been appreciated by the inventor of the present application that this approach suffers from draw backs when attempting to retro-fit additional services through the transit unit (i.e. at some later time after the initial installation has been completed). In particular, the wrap material must be cut off and replaced with a new wrap system and new steel strapping requiring the use of specialised tools each time the services passing through the transit unit are to be altered.

SUMMARY OF THE INVENTION

It is an object of the present invention to overcome, or substantially ameliorate, one or more of the disadvantages of the prior art, or to provide a useful alternative.

In one aspect of the present invention there is provided a fire and smoke containment services transit unit including: a casing defining a first opening at a first end, a second opening at a second end and an internal volume intermediate the first and second ends; an intumescent material housed within the internal volume, the intumescent material being responsive to heat so as to swell within the internal volume; the internal volume including the intumescent material, and each of the openings, being sized such that at least one service is threadable through the services transit unit without deforming the intumescent material; and first and second pieces of graphite impregnated foam, the first piece of graphite impregnated foam being shaped so as to form a friction fit within the first opening and the second piece of graphite impregnated foam being shaped so as to form a friction fit within the second opening and wherein each piece of graphite impregnated foam is shapeable to fit around the at least one service; wherein the casing is constructed from a material having a thermal conductivity of less than 5 watts per meter per Kelvin.

In one embodiment the casing material is, or includes, a plastics material. In one such embodiment the plastics material is a glass reinforced plastics material. In another such embodiment the plastics material is a fire-resistant plastics material. In yet another such embodiment the plastics material is a polyvinyl chloride plastics material.

In another embodiment the casing material is, or includes, timber.

In a second aspect of the present invention there is provided a method of routing at least one service through a barrier, the method including the steps of: providing a fire and smoke containment services transit unit as described above; forming a hole in the barrier such that the hole is sized to receive the fire and smoke containment services transit unit; positioning the fire and smoke containment services transit unit within the hole so as to provide a passage through the barrier; threading the at least one service through the fire and smoke containment services transit unit; and placing the first piece of graphite impregnated foam around the at least one service and packing the first piece of graphite impregnated foam into the first opening and placing the second piece of graphite impregnated foam around the at least one service and packing the second piece of graphite impregnated foam into the second opening.

In another aspect of the present invention there is provided a method of altering the service or services threaded through a fire and smoke containment services transit unit, the fire and smoke containment services transit unit being as described above and being mounted within a hole in a barrier, the method including the steps of: removing the first piece of graphite impregnated foam from the first opening and removing the second piece of graphite impregnated foam from the second opening; altering the service or services threaded through the transit unit; altering the first piece of graphite impregnated foam and the second piece of graphite impregnated foam to provide a friction fit around the altered services; and placing the first piece of graphite impregnated foam within the first opening and the second piece of graphite impregnated foam within the second opening.

The features and advantages of the present invention will become further apparent from the following detailed description of preferred embodiments, provided by way of example only, together with the accompanying drawings.

DETAILED DESCRIPTION OF PREFERRED EMBODIMENTS OF THE INVENTION

Referring to the figures, the fire and smoke containment services transit unit 1 includes a casing 2, which is constructed from a material having a thermal conductivity of less than 5 watts per meter per Kelvin and more preferably less than 0.5 watts per meter per Kelvin. Examples of suitable materials include plastics materials, such as a glass reinforced plastics material, a fire-resistant plastics material and/or a polyvinyl chloride plastics material. Other examples of suitable materials include timber, calcium silicate boards, such as Orbit FR Board, which has a thermal conductivity of approximately 0.137 watts per meter per Kelvin or Maxilite board, which has a thermal conductivity of approximately 0.14 watts per meter per Kelvin. Another example of a suitable material is Promatect H board, which has a thermal conductivity of approximately 0.242 W/m·K, as sold by Promat Australia Pty Ltd in Adelaide, South Australia. Further examples include Vermiclux and Supalux, which each have a conductivity of less than 5 W/m·K, or Monolux, which has a thermal conductivity of approximately 0.18 W/m·K, as sold by Intumex Asia Pacific in Northmead, NSW, Australia. Another example is Fyrchek Plasterboard, which has a thermal conductivity of approximately 0.18 W/m·K, as sold by CSR Gyprock in Sydney, NSW, Australia. However, it will be appreciated by those skilled in the art that other materials, such as magnesium oxide, graphite and/or high melting point thermoplastics for example, having a thermal conductivity of less than 5 watts per meter per Kelvin may be utilised to form the casing 2 of other embodiments.

It has been appreciated by the inventor that the thermal conductivity of the material used in the present invention provides better insulation characteristics as compared to the material typically used to form the casing of the typical prior art transit units. For example, in the Abesco CT120 and CT240 cable transit units the casing is formed from mild steel, which has a thermal conductivity of approximately 53 W/m·K. Hence, it is anticipated that embodiments of the present invention are likely to outperform the typical prior art transit units in relation to the desired insulation characteristics.

The casing defines a first opening 3 at a first end 4 and a second opening 5 at the second end 6, which is opposite the first end 4. Intermediate the first and second ends 4 and 6 is the internal volume 7 that is encased by the casing 2. The internal volume 7 and each of the openings 3 and 5 are sized to allow services 8 such as cables, pipes, etc to be threaded through the services transit unit, as shown for example in FIGS. 3 to 5, 7 and 8. The preferred embodiment may also be used in situations where blank openings must be provided within a fire barrier. The first and second openings 3 and 5 and the internal volume 7 of the preferred embodiment are rectangular shaped so as to allow at least one standard sized cable tray to pass through the barrier without requiring the cable tray to be cut down to size. However, it will be appreciated that the casing 2 of the transit unit 1 may take other shapes, such as circular, square, etc.

An intumescent material 9 is housed centrally within the internal volume 7. Prior to exposure to the heat of a fire, the intumescent material 9 maintains a slim profile as shown in the figures and hence there is plenty of space in the internal volume 7 to accommodate the services 8. However, when the transit unit 1 is exposed to the heat associated with a building fire, it swells and thereby seals the internal volume 7 against the passage of fire, smoke or heated gases through the transit unit 1. An example of a suitable intumescent material 9 is Kerafix Flexpan 200. In the preferred embodiment it is a 2 mm thick material, which is laminated in 4 layers. In another embodiment, the intumescent material 9 has a uniform thickness comprised of a single layer of material.

Additional strips of casing material 18, or metallic "ramps", are disposed on either side of the intumescent material 9. The additional strips of casing material 18 have a total thickness that is slightly greater than the thickness of the intumescent material 9. Hence, this results in a slight recessing of the intumescent material 9 relative to the additional strips, which minimises the risk of the intumescent material 9 being potentially displaced by the insertion of, and removal from, services 8 into the transit unit 1.

In another embodiment (not illustrated), the single portion of intumescent material 9 mentioned above is replaced with a parallel pair of portions of intumescent material, which are separated by a central gap. Hence, once exposed to the heat of a fire, the two separate portions of intumescent material expand with an air gap being formed between them. This air gap advantageously has the potential to further contribute to the thermal insulative performance of the transit unit. Such an air gap may be utilised to obtain better thermal insulative performance from the same total amount of intumescent material as compared to the embodiment described in the preceding two paragraphs. Alternatively, the air gap may be utilised to obtain the same thermal insulative performance from a lesser total amount of intumescent material.

Figure 1:
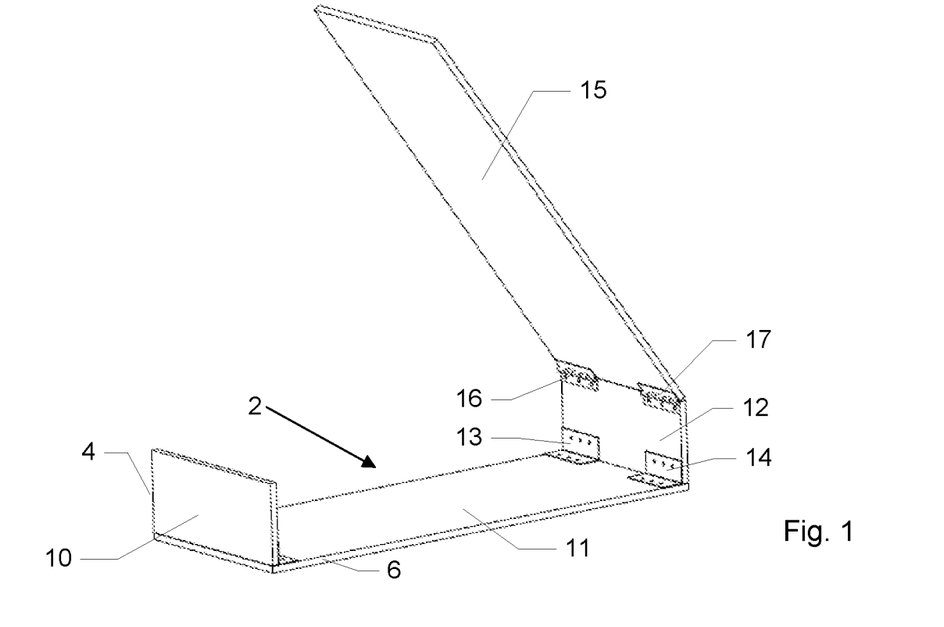
FIG. 1 is a perspective view of an embodiment of a services transit unit prior to the application of fire and smoke containment materials to the interior thereof.
Figure 2:
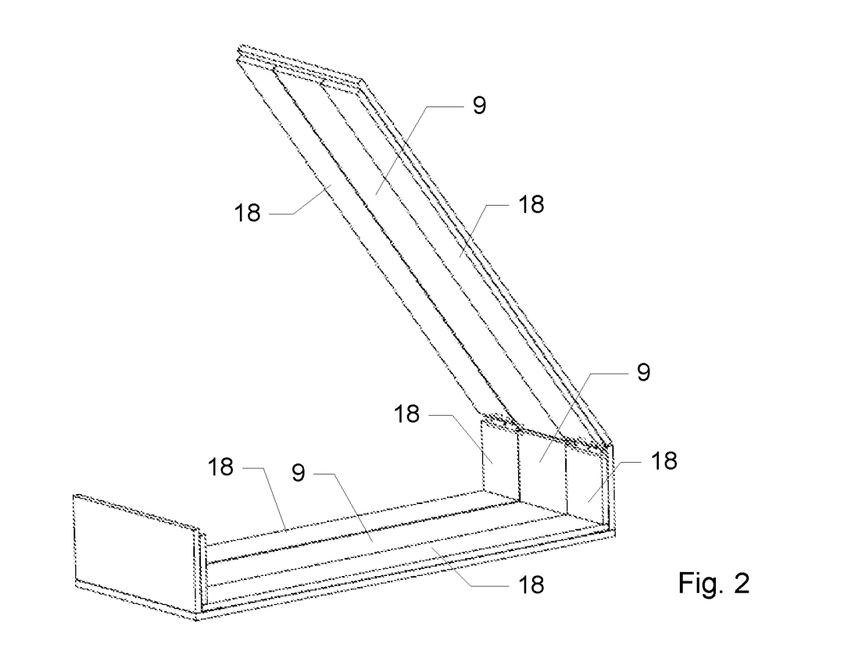
FIG. 2 is a perspective view of the embodiment once fire and smoke containment materials have been applied to the interior thereof.
Figure 3:
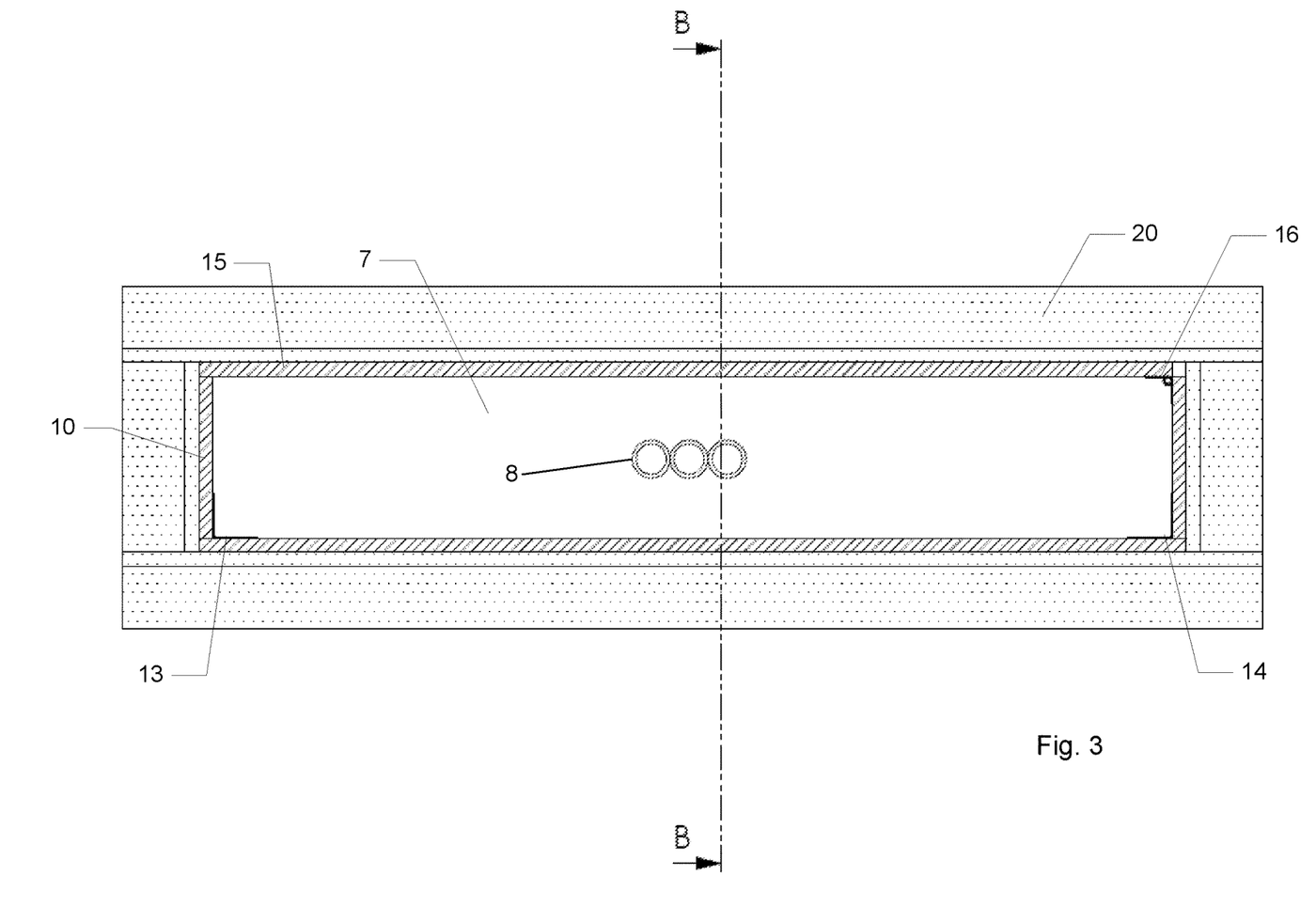
FIG. 3 is a front view of the embodiment prior to the application of fire and smoke containment materials to the interior thereof.
Figure 4:
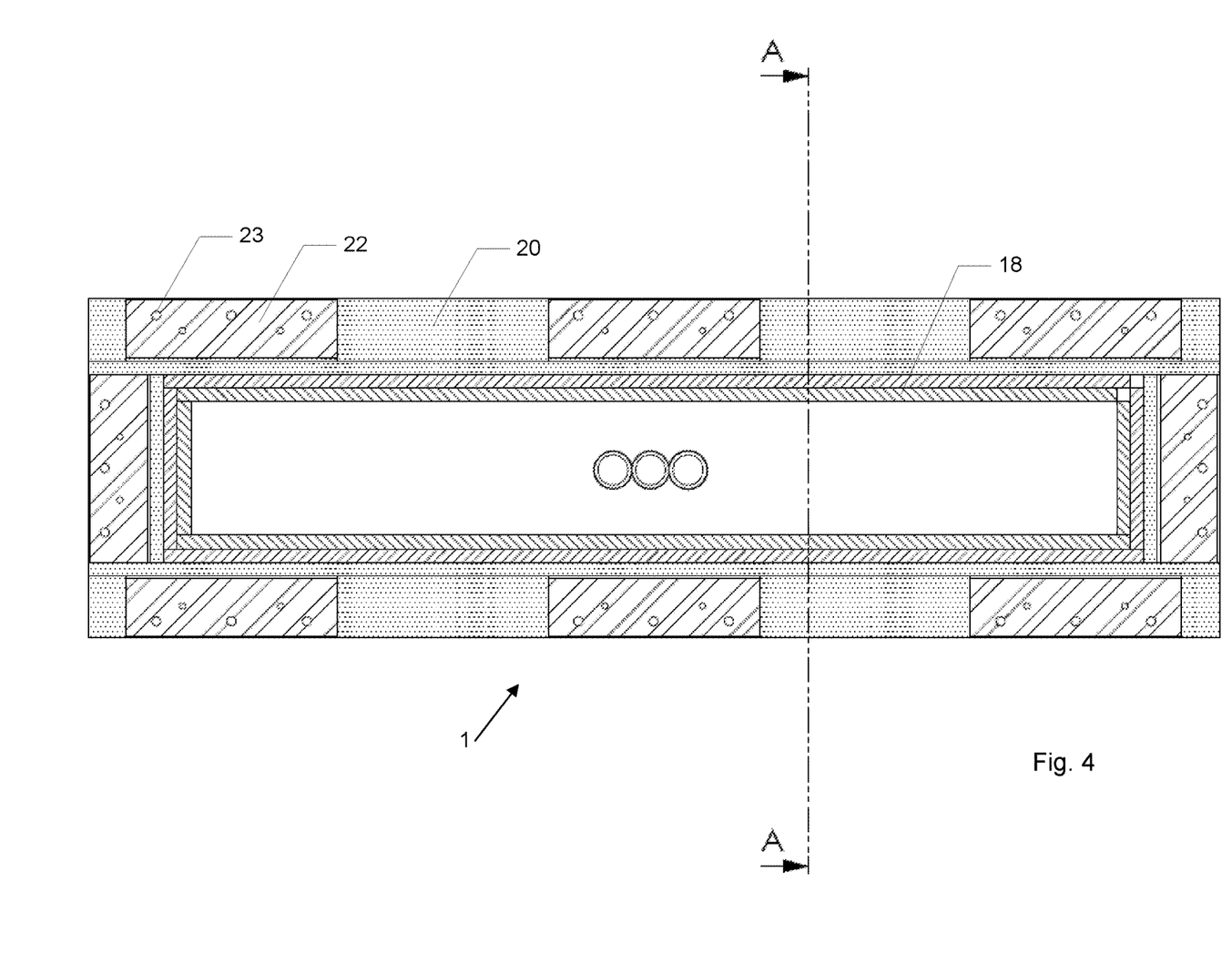
FIG. 4 is a front view of the embodiment once fire and smoke containment materials have been applied to the interior thereof.
Figure 5:
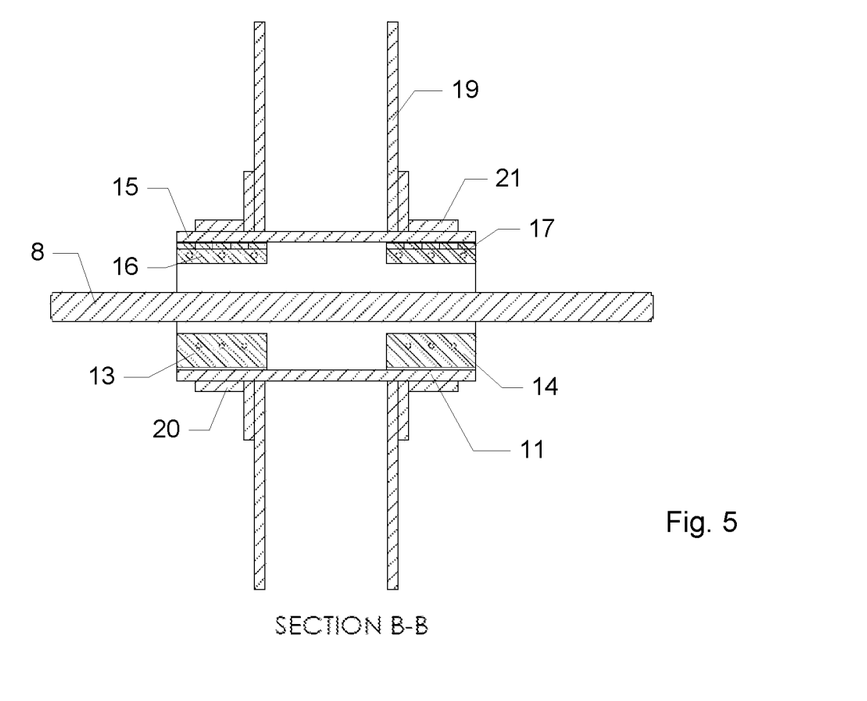
FIG. 5 is a sectional view of the embodiment taken along line B-B of FIG. 3.
Figure 6:
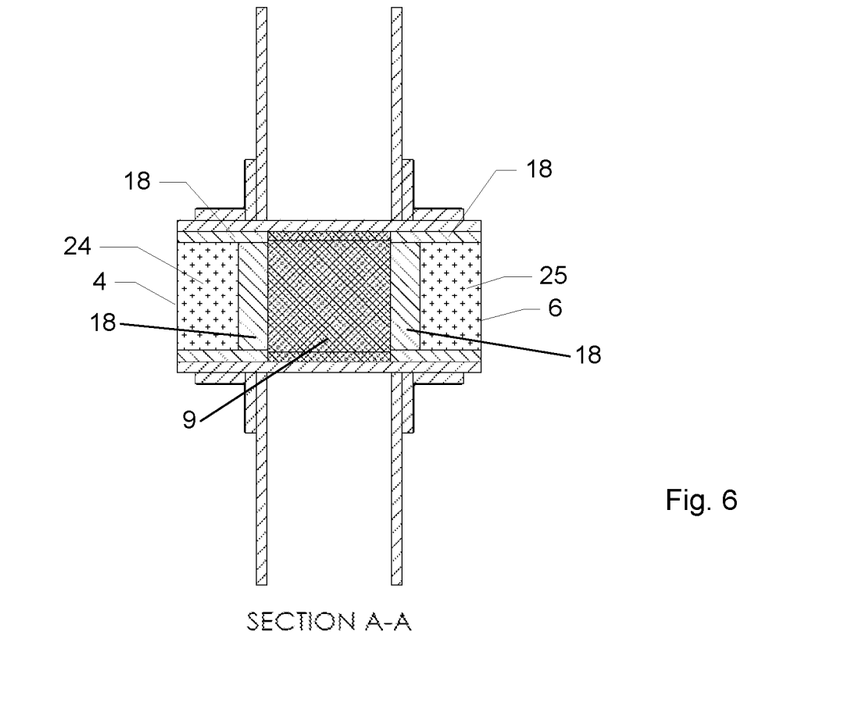
FIG. 6 is a sectional view of the embodiment taken along line A-A of FIG. 4.

As best shown, for example, in FIGS. 1 and 3, three portions 10, 11 and 12 of the casing material are interconnected by a pair of brackets 13 and 14 that each have an L-shaped profile. Rivets secure each face of the brackets 13 and 14 to the respective portions 10, 11 and 12. The brackets 13 and 14 are manufactured from 1.1 mm Zincanneal steel, which has a substantially higher thermal conductivity as compared to the casing material. Together the brackets 13 and 14 define a discontinuity, which can be clearly seen, for example, in FIG. 1. This stops the brackets 13 and 14 from extending continuously from the first end 4 to the second end 6, which, in turn avoids conduction by the brackets 13 and 14 of heat from one side of the transit unit 1 to the other. This assists the transit unit 1 to provide desirable insulation characteristics.

In some embodiments of the invention the casing 2 is formed as a continuous loop without the use of any hinges. However, the illustrated embodiment more readily allows for the unit 1 to be installed around existing services that cannot be easily disturbed, such as pipes for example, because portions 12 and 15 of the casing material are hingedly interconnected by a pair of piano hinges 16 and 17. An example of a suitable hinge is the Windeyer continuous hinge, which may be sourced from Windeyer in Minto, NSW, Australia. Together the hinges 16 and 17 define a discontinuity such that the hinge does not extend continuously from the first end 4 to the second end 6, which can be clearly seen, for example, in FIG. 1. This avoids conduction by the hinges 16 and 17 of heat between the first and second ends 4 and 6, which assists the transit unit 1 to provide desirable insulation characteristics.

The use of rivets 23 to affix the brackets 13 and 14 and the hinges 16 and 17 is advantageous because the rounded heads of the rivets have a low likelihood of snagging or fouling the services 8 as they are being threaded into or out of the internal volume 7 of the transit unit 1. Additionally, the rivets 23 have a low likelihood of causing injury as compared to other types of fasteners that have sharp exposed edges.

The preferred embodiment of the transit unit 1 may be used when wishing to route services through a barrier, such as a fire rated wall 19, and the method for doing so commences with the step of forming a hole in the wall 19. Typically, the hole is sized to receive the transit unit 1 with a tolerance of approximately 5-10 mm. Next the transit unit 1 is positioned within the hole. Preferably a fire-retardant material is used as packing to approximately centralise the transit unit 1 within the hole 19. Once positioned in this manner, the transit unit 1 provides a passage through the wall extending from the first opening 3, through the internal volume 7 and out the second opening 5, through which the services 8 are threaded.

The next step in the method is to affix a first mounting flange 20 to the transit unit 1 on a first side of the wall 19. In some embodiments, such as those illustrated in FIGS. 9 to 12, the positioning of a single planar board 26 suffices to affix the transit unit 29 within the hole 28. This means that the transit unit 29 can be installed into the barrier from one side of the wall 27 only, which is particularly useful for applications in which it is difficult to gain access to the other side of the barrier. In these embodiments the planar board 26 attaches to the wall 27 and the mounting flange of the transit unit 29 is attached to the board 26. However, other embodiments, such as that illustrated in FIGS. 1 to 8, also require a second mounting flange 21 to be affixed to the transit unit 1 on the opposite side of the wall 19. The mounting flanges 20 and 21 are sized so as to provide a friction fit when slid over the outer surface of the casing 2. When installed, they should be pushed firmly against the wall so as to secure the transit unit 1 relative to the wall 19. The first and second mounting flanges 20 and 21 are constructed from a material having a thermal conductivity of less than 5 watts per meter per Kelvin, and more preferably less than 0.5 watts per meter per Kelvin. This further reduces the potential for heat to transfer from a side of the transit unit 1 that is exposed to a fire to the other side. In the preferred embodiment the first and second mounting flanges 20 and 21 are constructed from a material that is, or includes, calcium silicate, such as the aforementioned Maxilite board. Brackets 22 and rivets 23 are utilized to form the Maxilite board into the L-shaped lengths that are joined to form the first and second mounting flanges 20 and 21.

FIGS. 1 to 8 illustrate an embodiment in which the hole 19 in the barrier is only 5 to 10 mm bigger than the transit unit 1. However, in some circumstances the hole may be larger and/or irregularly shaped. For example, in FIGS. 9 and 10 the hole 28 in the wall 27 is substantially larger than the outer surface of the single transit unit 29. Similarly, in FIGS. 11 and 12 the hole 28 in the wall 27 is substantially larger than the outer surfaces of the pair of transit units 29. To cope with this circumstance, the planar board 26 in the alternative embodiments illustrated in FIGS. 9 to 12 is larger than the mounting flanges 20 and 21 of the earlier described embodiment. More particularly, the planar board 26 extends for a greater distance, for example 5 cm, around the outer surface of the transit unit 29. Hence the planar board 26 provides a boarder around the transit unit 29 that shrouds the otherwise exposed oversized or irregularly shaped hole.

For some embodiments, and particularly those intended to be installed into barriers having irregularly shaped holes, intumescent material is also placed on the external surfaces of the casing 2, which swells in response to heat so as to more firmly affix the transit unit 1 within the irregularly shaped hole. This is particularly advantageous in relation to the embodiments intended to be installed from one side only of the barrier, since the external intumescent material will assist to affix the transit unit 1 within the hole in the event of a mechanical failure of the single mounting flange.

The next step in the method is to pack pieces of foam into the first and second openings 3 and 5. In the preferred embodiment the foam is a fire-retardant material, such as graphite impregnated foam 24 and 25. Each piece of graphite foam 24 and 25 is firstly slit, trimmed and/or otherwise shaped so as to form a friction fit around the services 8. Additionally, the outer edge of each of the pieces of graphite foam 24 and 25 are shaped so as to form a snug friction fit with the internal volume 7 of the casing 2. The first piece of graphite foam 24 is placed around the services 8 and packed into the first opening 3. Similarly, on the other side of the transit unit 1, the second piece of graphite foam 25 is placed around the services 8 and packed into the second opening 5. In the event of a fire, the pieces of graphite impregnated foam 24 and 25 provide a first line of defence, which 'buys time' whilst the intumescent material 9 is swelling in response to the heat. The swollen intumescent material 9 then provides a more resilient fire and smoke barrier, which can last up to four hours.

Figure 7:
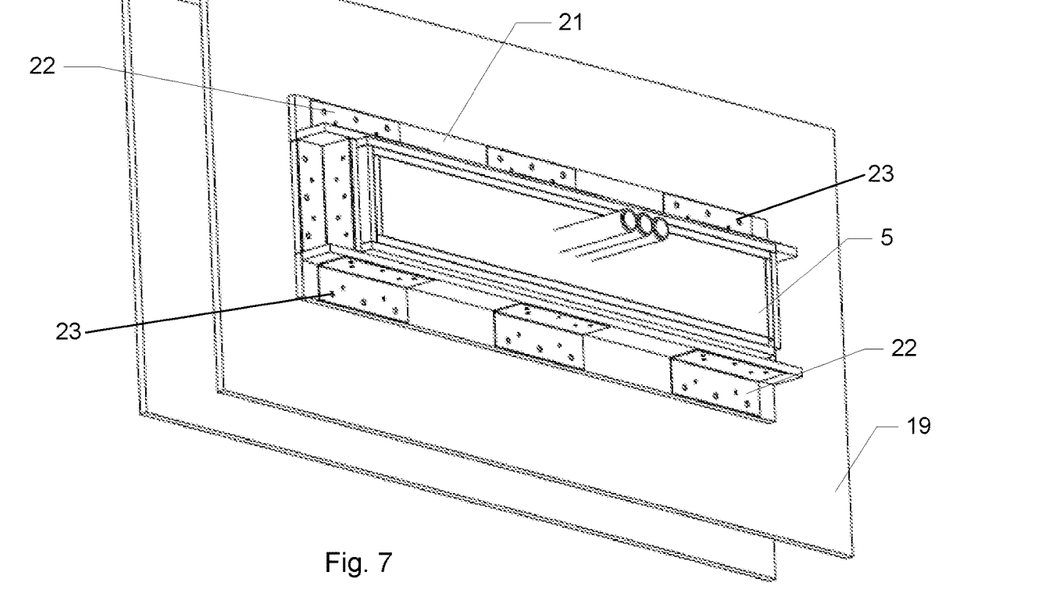
FIG. 7 is a perspective view of the embodiment as installed within a hole in a wall.
Figure 8:
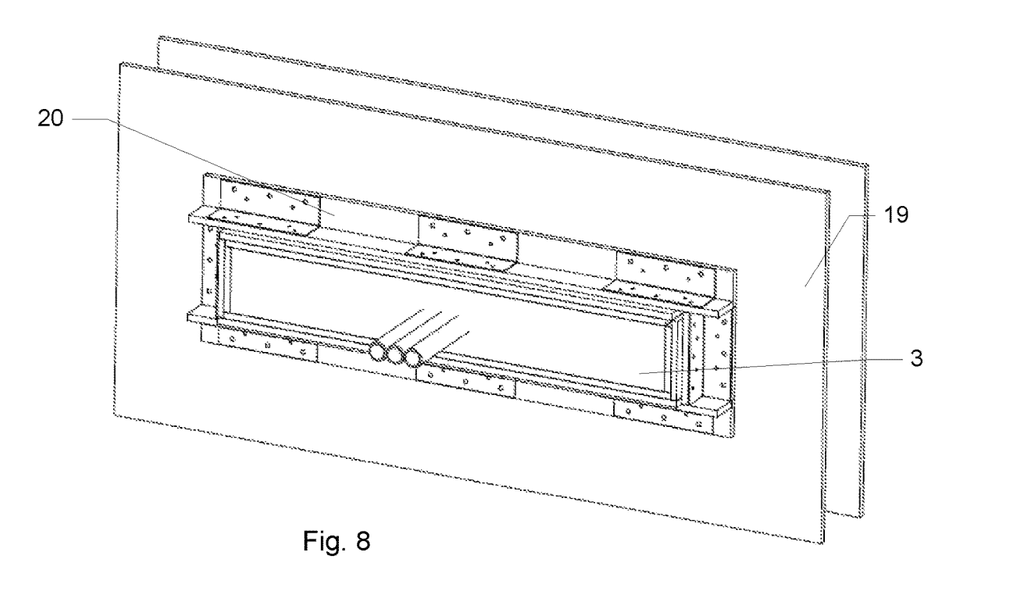
FIG. 8 is a perspective view of an installed embodiment as viewed from the opposite side of the wall as compared to that shown in FIG. 7.
Figure 9:
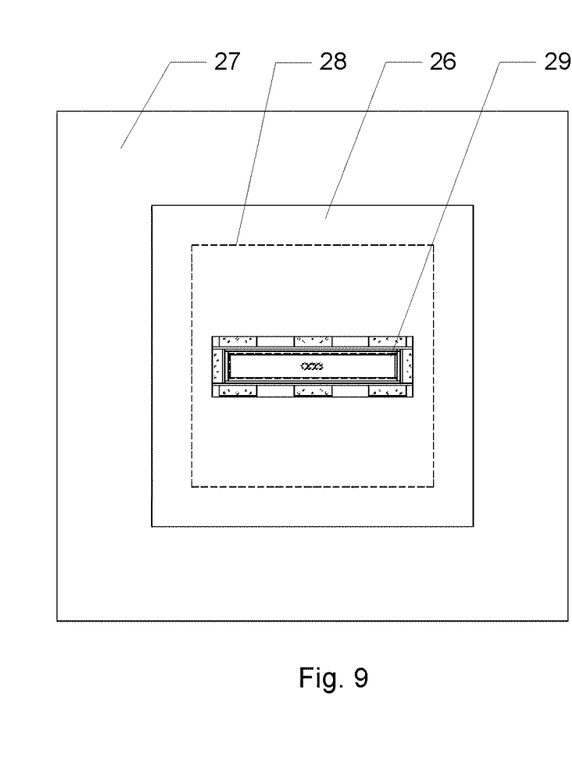
FIG. 9 is a front view of a first alternative embodiment of the transit unit.
Figure 10:
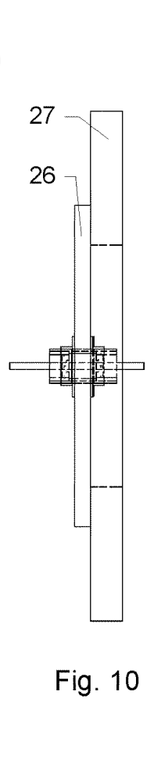
FIG. 10 is a side view of the first alternative embodiment of the transit unit.
Figure 11:
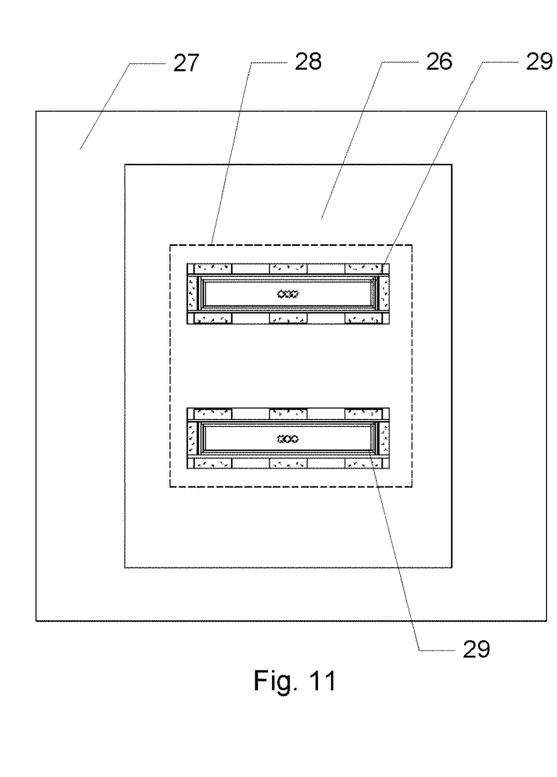
FIG. 11 is a front view of a second alternative embodiment of the transit unit.
Figure 12:
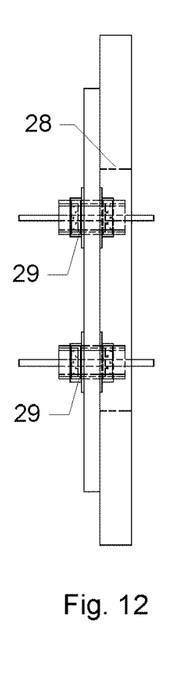
FIG. 12 is a side view of a second alternative embodiment of the transit unit.

Once installation of the transit unit 1 is completed, the services 8 are routed through the wall 19 using the transit unit 1 in the manner illustrated, for example, in FIGS. 7 and 8.

It is occasionally necessary to alter the service or services 8 that were threaded through the transit unit 1, for example to remove old cables and/or to retrofit new ones. The first step in this process is to remove the first piece of foam 24 from the first opening 3 and the second piece of foam 26 from the second opening 5. Next the services 8 that were previously threaded through the transit unit 1 are altered as required (i.e. redundant or faulty services may be removed and/or new services may be threaded through the transit unit 1). The next step is to alter the first piece of foam 24 and the second piece of foam 25 to provide a friction fit around the altered services. If new services 8 have been added, it may be necessary to re-shape the two pieces of graphite foam 24 and 25 so that they fit snugly around the new services. If redundant or faulty services have been removed, it may be necessary to shape new pieces of graphite foam 24 and 25 so as to fit around the new service configuration. Finally, the first and second pieces of foam 24 and 25 are placed within the first opening 3 and the second opening 5. Importantly, during the process of altering the services 8 it is not necessary to remove the transit unit 1 from the wall 19. Additionally, the embodiment of the invention dispenses with the prior art requirement to remove old thermally non-conducting wrapping and subsequently to install fresh thermally non-conducting wrapping.

The process to manufacture the transit units 1 commences with cutting of the calcium silicate board material to form the portions 10, 11, 12 and 15 on a table saw or the like. Also, the additional strips 18 are cut to size. Next the brackets 13 and 14 are riveted so as to connect portions 10, 11 and 12 using 12 mm steel rivets. The hinges 16 and 17 are then riveted so as to connect portions 12 and 15 using 12 mm steel rivets. Crosslinking PVA glue is then used to fix additional strips 18 onto the casing 2, leaving a gap that is intended for the intumescent material 9. The glued components are then placed in a heated hydraulic door press. Next the intumescent material 9 is cut to length and fixed using double-sided tape to the interior of the casing 2 in the gap that was left between the additional strips 18. Next the two pieces of graphite foam 24 and 25 are cut to size on a table saw, band saw, or the like, and inserted into the casing 2. Finally, lengths of calcium silicate board which will form the first and second mounting flanges 20 and 21 are cut to size and brackets 22, and 12 mm steel rivets 23 are used to form them into the L-shaped first and second mounting flanges 20 and 21, which are packaged loosely within the casing 2. In will be appreciated, however, that in other embodiments the first and/or second mounting flanges 20 and 21 may take alternative forms, for example they may be shaped as planar strips, blocks, etc.

While a number of preferred embodiments have been described, it will be appreciated by persons skilled in the art that numerous variations and/or modifications may be made to the invention without departing from the spirit or scope of the invention as broadly described. The present embodiments are, therefore, to be considered in all respects as illustrative and not restrictive.

The invention claimed is:

1. A fire and smoke containment services transit unit including:
   a casing defining a first opening at a first end, a second opening at a second end and an internal volume intermediate the first and second ends;
   an intumescent material housed within the internal volume, the intumescent material being responsive to heat so as to swell within the internal volume;
   the internal volume including the intumescent material, and each of the openings, being sized such that at least one service is threadable through the services transit unit without deforming the intumescent material; and
   first and second pieces of graphite impregnated foam, the first piece of graphite impregnated foam being shaped so as to form a friction fit within the first opening and the second piece of graphite impregnated foam being shaped so as to form a friction fit within the second opening and wherein each piece of graphite impregnated foam is shapeable to fit around the at least one service;
   wherein the casing is constructed from a material having a thermal conductivity of less than 5 watts per meter per Kelvin.

2. A fire and smoke containment services transit unit according to claim 1 wherein the casing material is, or includes, a plastics material.

3. A fire and smoke containment services transit unit according to claim 2 wherein the plastics material is a glass reinforced plastics material.

4. A fire and smoke containment services transit unit according to claim 2 wherein the plastics material is a fire-resistant plastics material.

5. A fire and smoke containment services transit unit according to claim 2 wherein the plastics material is a polyvinyl chloride plastics material.

6. A fire and smoke containment services transit unit according to claim 1 wherein the casing material is, or includes, timber.

7. A method of routing at least one service through a barrier, the method including the steps of:
   providing a fire and smoke containment services transit unit as defined in claim 1;
   forming a hole in the barrier such that the hole is sized to receive the fire and smoke containment services transit unit;
   positioning the fire and smoke containment services transit unit within the hole so as to provide a passage through the barrier;
   threading the at least one service through the fire and smoke containment services transit unit; and
   placing the first piece of graphite impregnated foam around the at least one service and packing the first piece of graphite impregnated foam into the first opening and placing the second piece of graphite impregnated foam around the at least one service and packing the second piece of graphite impregnated foam into the second opening.

8. A method of altering the service or services threaded through a fire and smoke containment services transit unit, the fire and smoke containment services transit unit being as defined in claim 1 and being mounted within a hole in a barrier, the method including the steps of:
   removing the first piece of graphite impregnated foam from the first opening and removing the second piece of graphite impregnated foam from the second opening;
   altering the service or services threaded through the transit unit;
   altering the first piece of graphite impregnated foam and the second piece of graphite impregnated foam to provide a friction fit around the altered services; and
   placing the first piece of graphite impregnated foam within the first opening and the second piece of graphite impregnated foam within the second opening.

* * * * *